United States Patent
Naccache et al.

(10) Patent No.: US 9,785,939 B2
(45) Date of Patent: Oct. 10, 2017

(54) METHOD FOR DEACTIVATING A PAYMENT MODULE, CORRESPONDING COMPUTER PROGRAM PRODUCT, STORAGE MEDIUM AND PAYMENT MODULE

(71) Applicant: Compagnie Industrielle et Financiere D'Ingenierie "Ingenico", Paris (FR)

(72) Inventors: David Naccache, Paris (FR); Pierre Quentin, Enghien-les-Bains (FR); Eric Brier, Malissard (FR); Dorina Ghiliotto-Young, Paris (FR)

(73) Assignee: INGENICO GROUP, Paris (FR)

( * ) Notice: Subject to any disclaimer, the term of this patent is extended or adjusted under 35 U.S.C. 154(b) by 338 days.

(21) Appl. No.: 14/689,817

(22) Filed: Apr. 17, 2015

(65) Prior Publication Data

US 2015/0302403 A1 Oct. 22, 2015

(30) Foreign Application Priority Data

Apr. 18, 2014 (FR) ..................................... 14 53543

(51) Int. Cl.
*G06K 5/00* (2006.01)
*G06Q 20/38* (2012.01)
(Continued)

(52) U.S. Cl.
CPC ....... *G06Q 20/3829* (2013.01); *G06Q 20/206* (2013.01); *G06Q 20/3226* (2013.01); *G06Q 2220/00* (2013.01)

(58) Field of Classification Search
CPC ........ G07F 7/1008; G07F 7/08; G06Q 20/341
(Continued)

(56) References Cited

U.S. PATENT DOCUMENTS

2010/0332387 A1  12/2010  Tanner et al.
2011/0270741 A1  11/2011  Kayser et al.
(Continued)

FOREIGN PATENT DOCUMENTS

WO  2010050652 A1  5/2010

OTHER PUBLICATIONS

French Search Report and Written Opinion dated Jan. 16, 2015 for French Application No. 1453543, filed Apr. 18, 2014.

*Primary Examiner* — Ahshik Kim
(74) *Attorney, Agent, or Firm* — David D. Brush; Westman Champlin & Koehler, P.A.

(57) ABSTRACT

The invention concerns a method for deactivating a payment module attachable to a communications terminal, comprising:
- a phase for deactivating comprising at least one step for erasing the main memory of said payment module with the exception of a non-volatile memory zone in which an encryption key k is stored, said encryption key k being available only when said main memory is empty;
- a phase for verifying comprising:
  - a step for verifying that said main memory is empty, delivering a positive or negative result of verification;
  - if said result of verification is positive:
    - a step for computing a response to a challenge preliminarily received by said payment module from an entity distinct from said payment module, said computation being implemented by means of said encryption key k;
    - a step for transmitting said response to said entity.

7 Claims, 2 Drawing Sheets

Figure 1:
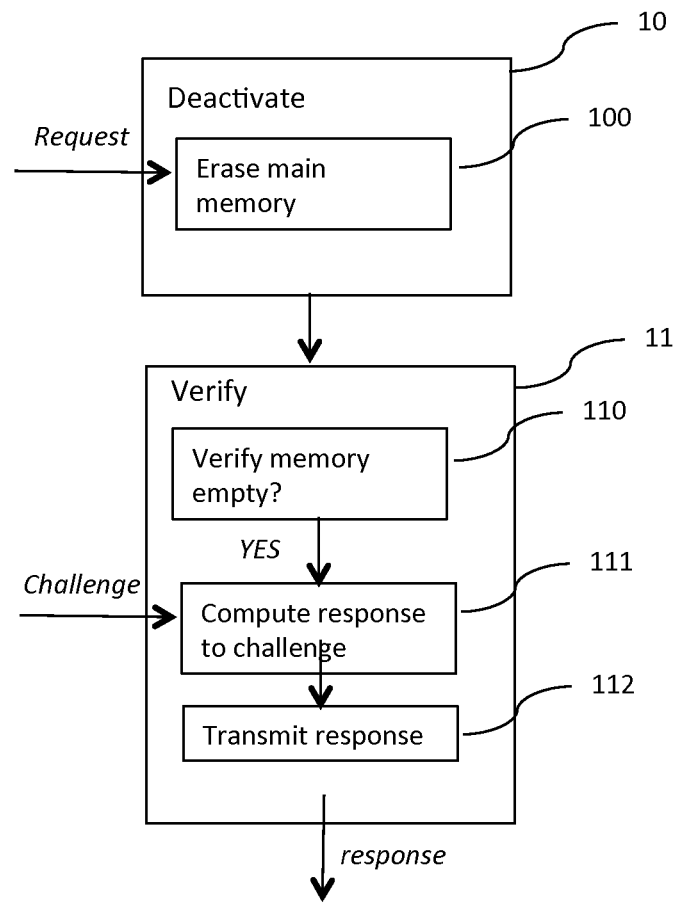

(51) Int. Cl.
*G06Q 20/20* (2012.01)
*G06Q 20/32* (2012.01)

(58) Field of Classification Search
USPC .................................................. 235/380, 383
See application file for complete search history.

(56) References Cited

U.S. PATENT DOCUMENTS

| | | | |
|---|---|---|---|
| 2013/0124346 A1 | 5/2013 | Baldwin et al. | |
| 2014/0122901 A1* | 5/2014 | Bilke | G06F 21/60 |
| | | | 713/193 |
| 2014/0214665 A1* | 7/2014 | Lee | G06Q 20/227 |
| | | | 705/41 |
| 2015/0294095 A1* | 10/2015 | Boivie | G06F 21/32 |
| | | | 726/19 |

\* cited by examiner

METHOD FOR DEACTIVATING A PAYMENT MODULE, CORRESPONDING COMPUTER PROGRAM PRODUCT, STORAGE MEDIUM AND PAYMENT MODULE

1 CROSS-REFERENCE TO RELATED APPLICATIONS

This Application claims priority to French Patent Application No. 1453543, filed Apr. 18, 2014, the content of which is incorporated herein by reference in its entirety.

2 FIELD OF THE DISCLOSURE

The present disclosure relates to the definitive deactivation of a payment module and more particularly to a payment module attachable to (for example a module that can be connected to or integrated with) a communications terminal.

3 PRIOR-ART SOLUTIONS

The deactivation of a payment module attachable to a communications module must provide for maximum security of use of this payment module by preventing any subsequent use of such a deactivated payment module and by preventing any access to sensitive data previously used or stored by such a deactivated payment module.

For example, when a payment module is integrated with a user's communications terminal, this user must request a definitive deactivation of the payment module before getting rid of it (by lending it or selling it to another party) so that a third party cannot have access to sensitive data (for example his bank card number) previously used or stored by the payment module.

In a classic solution all the memory of the payment module is erased when it is sought to deactivate this module, so as to prevent its subsequent operation and prevent access to stored data in this memory. A software program can then be used to verify that the memory has truly been erased.

However, a major drawback of this approach lies in the fact that it is impossible to make sure that a fraudulent program has not "taken charge" in order to simulate this erasure of the memory as well as the subsequent verification.

There is therefore a need for a solution that can be used to make sure that the payment module is definitively deactivated and that no sensitive data is accessible once the payment module is deactivated.

4 SUMMARY

An aspect of the disclosure relates to a method for deactivating a payment module attachable to a communications terminal, comprising the following two phases:
   a phase for deactivating comprising at least one step for erasing the entire memory of the payment module, called a main memory, with the exception of a non-volatile memory zone in which an encryption key k is stored, the encryption key k being available only when the main memory of the payment module is empty;
   at least one phase for verifying the deactivation comprising the following steps:
      a step for verifying that the main memory is empty, delivering a positive or negative result of verification;
      if the result of verification is positive:
         a step for computing a response to a challenge preliminarily received by the payment module from an entity distinct from the payment module, the computation being implemented by means of the encryption key k;
         a step for transmitting the response to the entity.

Thus, depending on the different embodiments, the disclosure proposes a novel and inventive solution for deactivating a payment module attachable to a communications terminal, making it possible to ensure in a secured manner that the module has truly been deactivated and that it is therefore no longer usable, and that all the pieces of sensitive data that it had previously used or stored have been truly erased from the memory of the deactivated module.

To this end, the deactivation process comprises two successive phases: a phase of deactivation, properly speaking, of the payment module, which consists in erasing the main memory of the payment module, and a phase for verifying the deactivation. This second phase for verifying the deactivation is secured and ensures the deactivation of the payment module, because it implements a special parameter, denoted as an encryption key k, stored in a specific non-volatile part of the memory of the payment module and being accessible via a utilization command, only when all the rest of the memory (denoted as the main memory) of the payment module has been erased.

Thus, if the main memory is not completely erased, the phase for verifying fails because the command for using the encryption key k needed for this verification is not available.

Indeed, the phase for verifying comprises firstly a step for verifying that the main memory is empty, for example by using a known program for verifying the content of a memory, delivering a positive or negative result of the verification.

If this result is positive, the phase for verifying then comprises a step for computing a response to a challenge transmitted to the payment module by a distinct entity. This computation of a response to the received challenge uses the encryption key k, made accessible by the erasure of the main memory of the payment module. This response to the challenge is then transmitted by the payment module to the distinct entity that has transmitted the challenge. This entity can then validate the fact that the deactivation of the payment module is effective, by verifying that the response to the challenge is correct.

If the result of the verification is negative, the encryption key is not accessible and it is then appropriate to try again to erase the main memory of the payment module.

It must be noted that the phase for verifying can be reiterated, for example when it is desired, some time after the definitive deactivation of a payment module, to verify that this module has not been fraudulently reactivated.

According to one characteristic of the disclosure, the phase for deactivating is triggered by the reception by the payment module of at least one request for deactivation received from the entity.

The deactivation of such a payment module is most frequently required by the user of this payment module, through his communications terminal, for example when he wishes to lend or sell his communications terminal. In this case, the user requests the deactivation of the payment module through the application dedicated to the administration of this payment module. The distinct entity requesting the deactivation of the payment module then corresponds to this application for administration of the payment module, and the result of this phase for verifying the deactivation of the payment module can then be transmitted to the intermediate secured server (gateway server) in charge of setting up a secured link between the payment module and then merchant's server, in the context of a remote payment.

It can also happen that the deactivation of the payment module is necessary when a fraudulent use of this payment module is detected, for example directly by the secured intermediate server which, in this case, constitutes the distinct entity requesting the deactivation of the payment module.

In particular, the encryption key k stored in the non-volatile memory of the payment module is never accessible in read mode.

Thus the encryption key k can never be used fraudulently to transmit a response to a challenge when the main memory of the payment module is not totally empty. Indeed, since this key is never accessible in read mode, it cannot be "retrieved" at any time for subsequent use to simulate a normal operation of a response to a challenge.

This is a dual security with the characteristic feature by which this encryption key k usable only when the main memory of the payment module is truly empty.

Thus, not only is the command for using the encryption key k available only when the main memory of the payment module is empty but the encryption key itself is never accessible in read mode (it cannot be used except via a command for the computation of a response to a challenge).

According to one particular aspect of the disclosure, the computation of a response to a challenge also uses at least one piece of data representing the request for deactivation, the piece of information belonging to the group comprising:
  an identifier of the entity;
  a timestamp of the request for deactivation.

Thus, the computation of the response to the challenge also takes account of data relating to the request for deactivation. For example, the data encrypted by the encryption key k is constituted not only by the challenge but also by an identifier of the entity that has requested the deactivation, as well as the date and time of this request for deactivation. This enables an additional verification, at the entity (for example the gateway server) receiving the response to the challenge, of the authenticity of this response.

According to one particular embodiment of the disclosure, the phase for deactivating is triggered after a step for validating the authorization of the entity to deactivate the payment module.

A preliminary check is therefore also implemented to make sure that the entity requesting the deactivation of the payment module is truly authorized to do so. If this verification is positive, then the phases of deactivation and verification are implemented.

The disclosure also pertains to a payment module attachable to a communications terminal comprising means of deactivation comprising:
  means for erasing the entire memory of the payment module, called a main memory, except for a non-volatile memory zone in which there is stored an encryption key k, the encryption key k being available only when the main memory of the payment module is empty;
  means for verifying that the main memory is empty, delivering a positive or negative result of verification;
  means for computing a response to a challenge preliminarily received by the payment module, coming from an entity distinct from the payment module, the computation being implemented by means of the encryption key k, the computation means being activated by a positive result of verification;
  means for transmitting the response to the entity.

The disclosure also pertains to a computer program downloadable from a communications network and/or stored in a computer-readable carrier and/or executable by a processor, comprising program code instructions for executing the method as described here above, when it is executed by a processor. This program can use any programming language whatsoever and takes the form of a source code, object code or a code intermediate between a source code and an object code, such as in partially compiled form or in any other desirable form.

Finally, the disclosure relates to a computer-readable and non-transient storage medium or information carrier storing a computer program comprising a set of instructions executable by a computer or a processor to implement the method as described here above. The information carrier can correspond to any entity or device whatsoever capable of storing the program. For example, the carrier can comprise a storage means such as a ROM, for example a CD ROM or a microelectronic circuit ROM or else again a magnetic recording means, for example a floppy disk or a hard disk drive. Besides, the information carrier can correspond to a transmissible carrier such as an electrical or optical signal which can be conveyed via an electrical or optical cable, by radio or by other means. A program according to the disclosure can in particular be uploaded to an Internet type network. As an alternative, the information carrier can correspond to an integrated circuit into which the program is incorporated, the circuit being adapted to executing or being used in the execution of the method in question.

5 LIST OF FIGURES

Figure 2A:
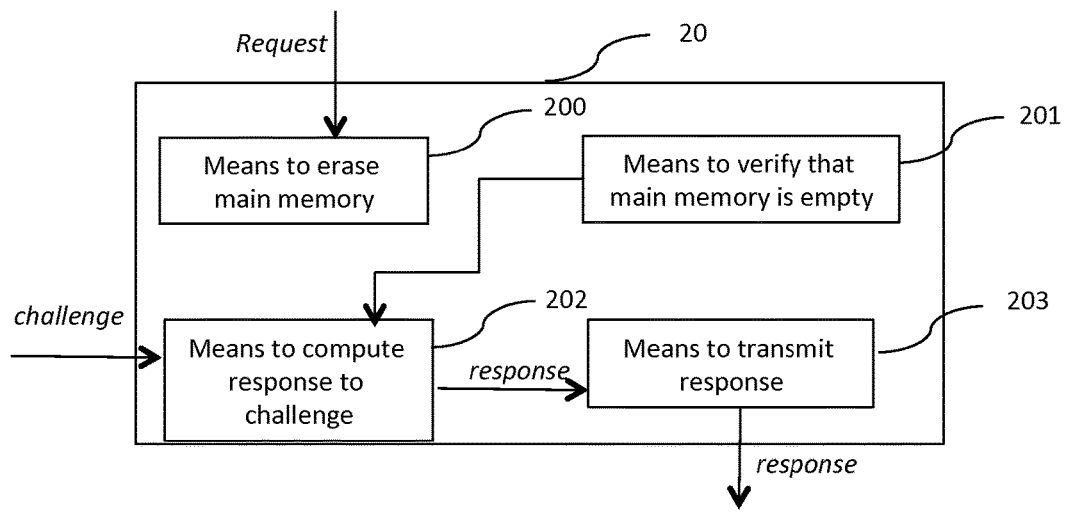
Figure 2B:
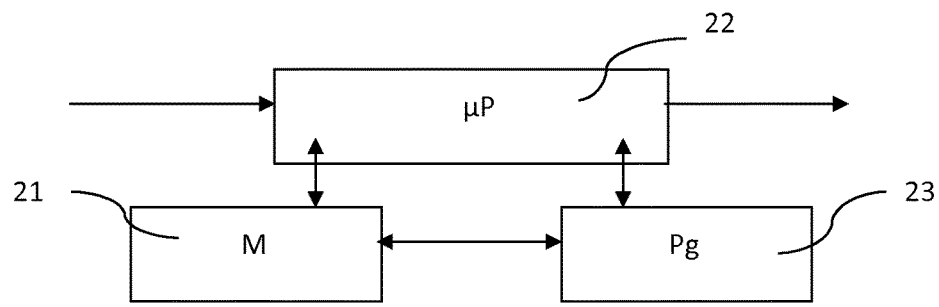

Other features and advantages shall appear more clearly from the following description of a particular embodiment, given by way of a simple, illustratory and non-exhaustive example, and from the appended drawings, of which:

FIG. 1 presents the main steps of a method for deactivating a payment module according to a first embodiment of the disclosure;

FIGS. 2a and 2b illustrate an example of a payment module according to one embodiment of the disclosure.

6 DETAILED DESCRIPTION OF ILLUSTRATIVE EMBODIMENTS

6.1 General Principle

The principle of an exemplary embodiment of the disclosure includes providing a verifiable technique for deactivating a payment module attachable to a communications terminal, making it possible to ensure that the module is definitively deactivated, in the sense that it can no longer be used for a payment operation and that sensitive data, if any, previously used or stored is no longer accessible.

Besides, the technique for deactivating a payment module according to one or more of the different embodiments makes it possible, at any time, to verify that a payment module has truly been deactivated.

This technique is implemented by the payment module itself and constitutes so to speak a secured verifiable self-deactivation.

The different embodiments described here below can be applied more particularly to a payment module comprising security mechanisms proper to a classic payment terminal and capable of processing a transaction by microcircuit card or by virtual card. This payment module is for example connected to or integrated into a user's communications terminal (PC, tablet, smartphone, etc.).

It goes without saying that the disclosure is not limited to this type of payment module but can also be applied to any device that has to cope with the same set of problems and issues of secured and verifiable deactivation.

6.2 Description of an Embodiment

FIG. 1 illustrates the main steps of a method for deactivating according to one embodiment of the disclosure, in which a payment module must be deactivated in a secured and verifiable way.

The method of deactivation comprises two successive phases: a phase 10 for deactivating and a phase 11 for verifying the deactivation.

In most cases, these two phases succeed each other so as to ensure that a payment module has truly been deactivated. It can also happen that the phase for verifying the deactivation is reiterated when it is sought to make sure again that the payment module has truly been preliminarily deactivated.

The first phase of deactivation 10 consists therefore chiefly in the erasure, at a step 100, of all the data stored in the main memory of the payment module, i.e. all the sensitive data needed for a payment operation (such as the user's bankcard number as well as possibly data pertaining to each of the payment operations performed by the payment module, etc.).

According to one embodiment of the disclosure, this phase 10 for deactivating is triggered by a request for deactivation sent out by an entity distinct from the payment module.

For example, this entity is also integrated into the user's communications terminal and corresponds to a module for the administration/management of the payment module, accessible by the user and offering especially a function of deactivation of the payment module. Thus, the user of the communications terminal integrating the payment module can decide to deactivate this module when he wishes to entrust his communications terminal to a third party. This administration module can in this case be connected to a secured intermediate server (gateway server) in charge of setting up a secured link between the payment module and the merchant's server in the context of a remote payment.

According to another example, the entity corresponds to this gateway server itself, capable of transmitting a request for deactivating to the payment module.

According to one particular embodiment of the disclosure, the phase 10 for deactivating is implemented, after reception of the request for deactivation by the payment module, only when this payment module has preliminarily verified that the entity originating the request is authorized to request such a deactivation.

For example, the payment module can have knowledge of one or more entities authorized to request its deactivation (in the form of a list of identifiers in the memory for example) and the request for deactivation can contain an identifier of the sending entity, thus enabling the payment module to compare this identifier with those on the list. When the payment module does not recognize the entity that has sent the request as an authorized entity, the phases of deactivation and of verification are not carried out.

According to one or more of the different embodiments, the main memory of the payment module is distinguished from a non-volatile memory zone also present in the payment module and used only to store a specific piece of data, called an encryption key k, used for the second phase of verification of the deactivation.

Depending on the different embodiments, this encryption key k is never accessible in read mode and its utilization command is available only when the main memory of the payment module is entirely empty. Thus, this key k cannot be used fraudulently by a software program or a hardware module to simulate a verification of deactivation while the main memory of the module is not empty.

When the phase 10 for deactivation is terminated, a phase 11 for verifying this deactivation is implemented starting with a step 110 for verifying the erasure of the main memory.

This step 110 for verifying can implement for example a known technique of software verification of the erasure of a memory and deliver a positive result of verification if the main memory of the payment module is effectively empty or a negative result when the memory is not empty (when the erasure has failed or again when the step of erasure has been fraudulently misused so as to not erase anything).

When the result of verification is negative, the payment module informs the entity that has initiated the deactivation about this fact. For example, the payment module transmits a message of a negative result of verification. Or else, on the contrary, the absence of a message (expected for a positive result of verification) would inform the entity that the result of verification is negative.

Thus, according to one embodiment of the disclosure, when the result of verification is positive, the entity that has started the deactivation receives a message indicating a positive result of verification and then sends a challenge to the payment module to implement the next step 111 of the verification phase 11.

According to another embodiment, a challenge is transmitted by the entity that has initiated the deactivation at the time of the request for deactivation for example, and when the result of verification is positive, the payment module directly implements the step 111 for computing a response to the previously received challenge.

This step 111 is therefore implemented by the payment module only when it has made sure beforehand that its main memory is empty. In addition, this step 111 cannot concretely be implemented unless this main memory is empty because the encryption key k is accessible to compute a response to a challenge only when the main memory of the payment module is empty.

Thus, if this condition is not fulfilled, the command for using the encryption key k is not available and the payment module cannot compute any response to the channel. In this case, when there is no response from the payment module to the preliminarily transmitted challenge, the entity that has initiated the deactivation understands that the deactivation of the payment module has not taken place properly.

On the contrary, when the main memory of the payment module has truly been entirely erased, the step 111 for computing a response to the challenge can be implemented. For example, this computation consists of an encryption of the challenge by the encryption key k, made accessible because of the preliminary erasure of the main memory. Thus, the command for using this encryption key k to encrypt the challenge is available and a response to the challenge can therefore be computed.

According to one alternative embodiment, other pieces of data can also be encrypted, in addition to the challenge, by the encryption key k. For example, data representing the entity that has initiated the request for deactivation (for example an identifier of this entity) and/or the timestamp of this request can be encrypted with the challenge. These pieces of data are known to the payment module through their transmission by the entity itself or through other means (timestamp available through the communications module to which the payment module is attached for example).

Once this response to the challenge has been computed, it is transmitted at a transmission step 112 to the entity that has initiated the request for deactivation. This entity can thus verify that the deactivation of the payment module has truly taken place, if the response to the challenge corresponds to the one expected. Indeed, if this response is accurate, the entity that has initiated the request for deactivation can be assured that the payment module has been deactivated in a secured manner and that no sensitive data is any longer accessible via the memory. If the response to the challenge is not right, a deactivation can again be triggered or an alert can be sent.

6.3 Description of an Example of a Payment Module

FIG. 2a illustrates an example of a payment module 20 according to one embodiment of the disclosure, presenting especially a structure and function for deactivating and verifying this deactivation.

For example, such a payment module 20 capable of being connected or integrated with a user's communications terminal (PC, tablet, smartphone, etc.) comprises security mechanisms proper to a classic payment terminal and is capable of processing a transaction by microcircuit card or by virtual card. It can therefore especially be led to store sensitive data such as a bankcard number or data relating to a transaction in particular. For reasons of security related to the bank card, such a payment module should be capable of being deactivated in a sure and verifiable way so that it cannot be used once deactivated and so that the data that it might have memorized are no longer accessible.

Thus, depending on the different embodiments, such a payment module 20 comprises element 200 for erasing its main memory, i.e. all the memory used to store sensitive data (for example bankcard numbers, bank account numbers, certificates, etc.) as well as element 201 for verifying this erasure. These elements of erasure 200 and for verifying the erasure 201 can be implemented by the execution of one or more known software programs.

Besides, the payment module 20 also has elements (not shown) for receiving a deactivation request sent by an entity (not shown) distinct from the payment module 20, activating element 200 of erasure especially.

Depending on the embodiments, the payment module 20 also has an element 202 for computing a response to a preliminarily received challenge (via elements, not shown, for receiving such a challenge). These elements 202 for computing a response to a challenge implement one or more algorithms (known) for encrypting the challenge, using especially an encryption key k stored in a non-volatile zone of the memory (not shown) of the payment module 20. These computation elements 202 are activated upon reception of a positive result of verification, sent by the verification element 201 for example, confirming that the main memory of the payment module 20 has truly been entirely erased by the erasure element 200. In addition, the command for using the encryption key k is available only when this main memory is effectively empty.

Thus, the computation element 202 can compute a response to a challenge only when the main memory of the payment module 20 is empty, thus ensuring that the module has truly been deactivated.

The response to the challenge is then transmitted, via transmission element 203, to the entity that has initiated the request for deactivation.

Once this response has been transmitted by the payment module 20, this entity distinct from the payment module 20 can verify that it truly corresponds to the challenge previously transmitted to the payment module. If this is the case, the entity that has initiated the request for deactivation can be assured that the payment module has been deactivated in a secured manner and that no sensitive data is any longer accessible via its memory.

All the characteristics described here above with reference to the different embodiments of the method for deactivating are of course applicable to the payment module itself.

Furthermore, FIG. 2b illustrates, in another way, the payment module 20 comprising a memory 21 constituted by a buffer memory, a processing unit 22 equipped for example with a microprocessor and driven by the computer program 23 carrying out a method for deactivating according to one or more of the different embodiments of the disclosure.

At initialization, i.e. when the communications terminal to which the payment module is connected is powered on, the code instructions of the computer program 23 are for example loaded into a memory and then executed by the processor of the processing unit 22. The processing unit 22 inputs at least one piece of data representing a request for deactivation and possibly a challenge. The microprocessor of the processing unit 22 implements the steps of the method for deactivating according to the instructions of the computer

The invention claimed is:

1. A method for deactivating a payment module attachable to a communications terminal, the method comprising the following phases:
   a phase of deactivating comprising at least one act of erasing an entire memory of the payment module, called a main memory, with the exception of a non-volatile memory zone in which an encryption key is stored, said encryption key being available only when the main memory of the payment module is empty; and
   at least one phase of verifying said deactivation comprising the following acts:
      verifying that said main memory is empty, delivering a positive or negative result of verification;
   if said result of verification is positive:
      computing a response to a challenge preliminarily received by said payment module from an entity distinct from said payment module, said computation being implemented by using said encryption key; and
      for transmitting said response to said entity.

2. The method for deactivating a payment module according to claim 1, wherein said phase of deactivating is triggered by reception, by said payment module, of at least one request for deactivation coming from said entity.

3. The method for deactivating a payment module according to claim 1, wherein said encryption key stored in said non-volatile memory of said payment module is never accessible in read mode.

4. The method for deactivating a payment module according to claim 2, wherein said computing a response to a challenge also uses at least one piece of data representing said request for deactivation, piece of data belonging to the group consisting of:
   an identifier of said entity;
   a timestamp of said request for deactivation.

5. A method for deactivating a payment module according to claim 1, wherein said phase of deactivating is triggered after an act of validating an authorization of said entity to deactivate said payment module.

6. A payment module attachable to a communications terminal and comprising means of deactivation comprising:
- a main memory comprising a non-volatile memory zone in which there is stored an encryption key;
- means for erasing the entire main memory of said payment module, except for the non-volatile memory zone, said encryption key being available only when said main memory of said payment module is empty;
- means for verifying that said main memory is empty, delivering a positive or negative result of verification;
- means for computing a response to a challenge preliminarily received by said payment module, coming from an entity distinct from said payment module, said computation being implemented by using said encryption key, said computation means being activated by a positive result of verification;
- means for transmitting said response to said entity.

7. A computer readable and non-transient storage medium storing a computer program comprising a set of instructions executable by a computer or a processor to implement a method for deactivating a payment module attachable to a communications terminal, the method comprising the following phases:
- a phase of deactivating comprising at least one act of erasing an entire memory of the payment module, called a main memory, with the exception of a non-volatile memory zone in which an encryption key is stored, said encryption key being available only when the main memory of the payment module is empty; and
- at least one phase of verifying said deactivation comprising the following acts:
  - verifying that said main memory is empty, delivering a positive or negative result of verification;
  - if said result of verification is positive:
    - computing a response to a challenge preliminarily received by said payment module from an entity distinct from said payment module, said computation being implemented by using said encryption key; and
    - transmitting said response to said entity.

* * * * *

UNITED STATES PATENT AND TRADEMARK OFFICE
CERTIFICATE OF CORRECTION

PATENT NO. : 9,785,939 B2
APPLICATION NO. : 14/689817
DATED : October 10, 2017
INVENTOR(S) : David Naccache et al.

Page 1 of 1

It is certified that error appears in the above-identified patent and that said Letters Patent is hereby corrected as shown below:

On the Title Page

In the Abstract:

Please replace the Abstract with the following Abstract:
--A method is provided for deactivating a payment module attachable to a communications terminal. The method includes: a deactivating phase and a verifying phase. The deactivating phase includes at least one step of erasing the main memory of the payment module with the exception of a non-volatile memory zone in which an encryption key is stored, the encryption key being available only when the main memory is empty. The verifying phase includes: a step of verifying that the main memory is empty, delivering a positive or negative result of verification; and if the result of verification is positive: a step of computing a response to a challenge preliminarily received by the payment module from an entity distinct from the payment module, the computation being implemented by using the encryption key; and a step of transmitting the response to the entity.--

In the Claims

Column 8, Line 52, Claim 1 delete "for transmitting" and insert --transmitting--

Signed and Sealed this
Twenty-sixth Day of February, 2019

Andrei Iancu
*Director of the United States Patent and Trademark Office*